United States Patent
Been et al.

(10) Patent No.: US 10,119,478 B2
(45) Date of Patent: Nov. 6, 2018

(54) HIGH RELIABILITY HIGH FLOW REDUNDANT TRIP BLOCK

(71) Applicants: John J. Been, Fort Collins, CO (US); Michael S. Zrubek, Windsor, CO (US); Jonathan P. Workman, Loveland, CO (US)

(72) Inventors: John J. Been, Fort Collins, CO (US); Michael S. Zrubek, Windsor, CO (US); Jonathan P. Workman, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 157 days.

(21) Appl. No.: 14/750,750

(22) Filed: Jun. 25, 2015

(65) Prior Publication Data

US 2016/0376999 A1 Dec. 29, 2016

(51) Int. Cl.
| | |
|---|---|
| *F01D 21/18* | (2006.01) |
| *F02C 9/26* | (2006.01) |
| *F16K 11/06* | (2006.01) |
| *F16K 27/04* | (2006.01) |
| *F02C 7/232* | (2006.01) |
| *F15B 13/04* | (2006.01) |
| *F15B 13/08* | (2006.01) |

(52) U.S. Cl.
CPC .............. *F02C 9/26* (2013.01); *F01D 21/18* (2013.01); *F02C 7/232* (2013.01); *F15B 13/0406* (2013.01); *F15B 13/0842* (2013.01); *F16K 11/06* (2013.01); *F16K 27/04* (2013.01)

(58) Field of Classification Search
USPC .................................................... 137/625.18
See application file for complete search history.

(56) References Cited

U.S. PATENT DOCUMENTS

| | | | | |
|---|---|---|---|---|
| 1,208,480 | A | * 12/1916 | Casey | ............ B60R 25/04 123/198 B |
| 1,347,833 | A | * 7/1920 | Bakley | ............ B60R 25/042 137/552.5 |
| 3,012,576 | A | 12/1961 | Williams | |
| 3,756,282 | A | 9/1973 | Knutson | |
| 4,155,535 | A | 5/1979 | Seamone | |

(Continued)

FOREIGN PATENT DOCUMENTS

| | | |
|---|---|---|
| DE | 19836042 A1 | 2/2000 |
| DE | 10240852 A1 | 3/2004 |

(Continued)

OTHER PUBLICATIONS

Parker Servovalves; date last visited Oct. 11, 2012; 2 pages printed from internet; http://www.parker.com/portal/site/PARKER/menuitem. 7100150cebe5bbc2d6806710237ad1ca/?vgnextoid= f5c9b5bbec622110VgnVCM10000032a71dacRCRD&vgnextfmt= DE&vgnextdiv=&vgnextcatid=1537927&vgnextcat= SERVOVALES.

(Continued)

*Primary Examiner* — John Fox
(74) *Attorney, Agent, or Firm* — Reinhart Boerner Van Deuren P.C.

(57) ABSTRACT

A trip block is provided. The trip block includes a single housing which commonly houses multiple valve assemblies. Each valve assembly includes a rotary valve member arrangement. The rotary valve member arrangement includes a spool and a sleeve with a predefined radial clearance between the spool and sleeve.

11 Claims, 10 Drawing Sheets

(56) References Cited

U.S. PATENT DOCUMENTS

| | | |
|---|---|---|
| 4,177,834 A | 12/1979 | Bonney |
| 4,199,007 A | 4/1980 | Holmes |
| 4,201,005 A | 5/1980 | Hunt |
| 4,658,859 A | 4/1987 | Backe et al. |
| 4,800,924 A | 1/1989 | Johnson |
| 4,977,816 A | 12/1990 | Kuttruf |
| 5,014,748 A | 5/1991 | Nogami et al. |
| 5,090,194 A * | 2/1992 | Richards ............ F01D 17/26 137/625.23 |
| 5,467,800 A | 11/1995 | Sallas |
| 5,522,419 A | 6/1996 | Sand |
| 5,597,014 A | 1/1997 | Vick |
| 5,839,463 A | 11/1998 | Blackmon et al. |
| 5,868,165 A | 2/1999 | Tranovich |
| 5,954,093 A | 9/1999 | Leonard |
| 6,182,696 B1 * | 2/2001 | Rainwater ........... F16K 27/062 137/613 |
| 6,826,998 B2 | 12/2004 | Pinot |
| 7,322,375 B2 | 1/2008 | Goldfarb et al. |
| 7,409,965 B2 * | 8/2008 | Blaser ................. F01D 17/145 137/553 |
| 8,794,268 B2 * | 8/2014 | Cole .................... F01D 17/145 137/557 |
| 9,127,694 B2 | 9/2015 | Greeb et al. |
| 2006/0067835 A1 | 3/2006 | Duwel et al. |
| 2007/0297907 A1 | 12/2007 | Giebmanns |
| 2008/0087339 A1 | 4/2008 | Blaser et al. |
| 2009/0194169 A1 * | 8/2009 | Greeb ................. G05D 16/202 137/85 |
| 2010/0065585 A1 | 3/2010 | Romanin et al. |
| 2010/0065586 A1 | 3/2010 | Romanin et al. |
| 2012/0114460 A1 | 5/2012 | Cole |
| 2012/0241010 A1 | 9/2012 | Greeb |
| 2013/0062542 A1 * | 3/2013 | Greeb ................. F15B 13/0406 251/129.01 |
| 2013/0134341 A1 | 5/2013 | Cheng |
| 2014/0209196 A1 | 7/2014 | Goll |

FOREIGN PATENT DOCUMENTS

| | | |
|---|---|---|
| GB | 962794 | 7/1964 |
| GB | 1244976 | 9/1971 |

OTHER PUBLICATIONS

Bosch Rexroth Hydraulic Servos; date last visited Oct. 11, 2012; 1 page printed from internet; http://www.boschrexroth.com/country_units/america/united_states/sub_websites/brus_brh_i/en/products_ss/08_proportional_servo_valves/06_servo_valves/index.jsp.

Woodward Direct Drive Servovalves; date last visited Oct. 9, 2012; 1 page printed from internet; http://www.woodward.com/DirectDrive Servovalves.aspx.

Woodward Electro-Hydraulic Servovalves; dated last visited Oct. 9, 2012; 1 page printed from internet; http://www.woodward.com/servovalves.aspx.

MOOG Electrohydraulic Valves . . . A Technical Look; date last visited Oct. 9, 2012; 24 pages printed from internet; http://www.moog.com/literature/ICD/Valves-Introduction.pdf.

* cited by examiner

HIGH RELIABILITY HIGH FLOW REDUNDANT TRIP BLOCK

FIELD OF THE INVENTION

This invention generally relates to turbine systems, and more particularly to turbine safety systems having a trip valve.

BACKGROUND OF THE INVENTION

Contemporary turbine systems employ a variety of safety systems to monitor and ensure that the system operates in a safe condition. One such turbine safety system is a hydraulic trip valve. Such a valve is situated within the fuel flow to the turbine engine. In the event a safety controller detects on unsafe operating condition of the turbine, e.g. an over-speed condition, the trip valve closes off the flow of fuel to the turbine.

In one such configuration, the trip valve is held open under hydraulic pressure. A trip block is interposed between this hydraulic pressure head and a drain. The trip block includes one or more valves which are held in a closed configuration such that the hydraulic pressure head cannot drain through the trip block to the drain. As a result, the hydraulic pressure maintains the trip valve in an open state.

However, in the event of the above referenced unsafe operating condition, the trip block will be commanded to open, and allow the hydraulic pressure head to pass through the trip block and to the drain. This results in a loss of the hydraulic pressure responsible for holding the trip valve in an open state. The trip valve then closes, and the fuel supply to the turbine is cut off. Contemporary trip blocks typically include multiple redundant valves, such that if one valve does not open, the others will, and the aforementioned draining function will still occur.

While such systems have proven to be effective, the trip block is not without its deficiencies. For example, one typical embodiment of a trip block is a plurality of stand-alone valves which are interconnected to one another via exterior plumbing. In the event one valve fails, the others will still move to open and allow the aforementioned draining function to occur. This embodiment tends to require a large footprint of space, and due to its exterior plumbing, has multiple failure points and is relatively complex.

Another typical embodiment of a trip block is a plurality of valves which are connected to a manifold. Each valve has its own stand-alone housing. The manifold is typically a separate housing with a plurality of passageways. The valves are mounted at various locations on the exterior of the manifold housing by mounting the valve housing of each valve to the manifold housing. This also results in a large footprint design. Further, given that each valve has its own housing, and the manifold itself is a relatively large housing, the overall weight of such an embodiment is also not desirable.

Further, in both of the above described embodiments, certain implementations thereof do not allow for the usage of the trip block when a replacement of one of the failed valves thereof is occurring. In other words, the entire system, including the turbine, must be taken off line to repair the trip block.

Yet further, contemporary trip blocks typically employ valves which require high actuation forces, and as such, high powered actuators. Such actuators increase the cost of operation of the system, and also add to its size and weight. Indeed, contemporary trip blocks typically employ linearly moving valve elements. These linear elements require tight radial clearances to keep the linear element centered to reduce leakage. These tight clearances can become jammed with contamination if the hydraulic fluid is not filtered to appropriate levels, typically ISO 4406 class 16/13 or cleaner.

In view of the foregoing, there is a need in the art for a compact, lightweight, trip block which requires a relatively small actuator for each of the valves employed thereby.

The invention provides such a trip block. These and other advantages of the invention, as well as additional inventive features, will be apparent from the description of the invention provided herein.

BRIEF SUMMARY OF THE INVENTION

In one aspect, the invention provides a trip block which advantageously requires reduced actuation force relative to prior designs. An embodiment of such a trip block according to this aspect includes a housing having an inlet, an outlet, and a plurality of interconnected passageways. The trip block also includes a plurality of valve assemblies. A portion of each valve assembly is housed within the housing. Each valve assembly of the plurality of valve assemblies includes a rotary valve member arrangement and an actuator for actuating the rotary valve member arrangement. Each one of the plurality of valve assemblies is arranged within the housing to govern a flow of fluid between the inlet and the outlet.

In this embodiment, the rotary valve member arrangement includes a spool rotatably disposed within a sleeve. The spool includes a shaft and at least one valve member mounted to the shaft. The at least one valve member is cup-shaped and includes a plurality of ports extending through a sidewall of the at least one valve member. An interior surface of the sidewall of the at least one valve member includes a continuous groove which extends across each one of the plurality of ports such that the sidewall has a reduced cross-sectional thickness in an area of each port.

The sleeve is cylindrical in shape and includes a plurality of ports extending through a sidewall thereof. Select ones of the plurality of ports of the at least one valve member are selectably alignable with select ones of the plurality of ports of the sleeve. A radial gap is formed between an outer periphery of the at least one valve member and an inner periphery of the sleeve. The radial gap is 0.0005 inches to 0.005 inches.

In this embodiment, the spool is rotatably supported by a bearing adjacent to each end of the spool. The bearings are axially outside of a plurality of seals of the valve assembly such that the bearings are not exposed to a fluid flowing through the housing.

In another aspect, the invention provides a trip valve which utilizes a housing having a reduced number of passageways therethrough than prior designs. Such a configuration advantageously reduces the complexity of the trip block. An embodiment according to this aspect, the trip block includes a housing having an inlet and an outlet. A first valve assembly is partially disposed within a first cavity of the housing. The first cavity extends normal to a direction of flow between the inlet and outlet. A second valve assembly is partially disposed within a second cavity of the housing. The second cavity is normal to the direction of flow between the inlet and the outlet. A third valve assembly is partially disposed within a third cavity of the housing. The third cavity is normal to the direction of flow between the inlet and the outlet. A first flow passage extends only between the first cavity and the second cavity. A second flow passage extends only between the first cavity and the second cavity. A third flow passage extends only between the second cavity and the third cavity. A fourth flow passage extends between the first cavity, the second cavity, and the third cavity.

In this embodiment, each of the first, second, and third flow passages includes an enlarged portion at end points of the respective first, second, and third flow passage. The enlarged portion has a cross-sectional area normal to a direction of flow between the inlet and the outlet which is larger than a cross-sectional area normal to the direction of flow of each respective flow passage adjacent the enlarged portion thereof.

In this embodiment, the first, second, and third valve assemblies each includes a rotary valve member arrangement, an actuator for actuating the rotary valve member arrangement, and a return device coupled to the valve member arrangement. The rotary valve member arrangement includes a spool rotatably mounted within a sleeve of the rotary valve member arrangement. The sleeve includes a plurality of seals along an outer periphery thereof for sealingly engaging an interior surface of the housing. A radial gap is formed between an outer periphery of at least one valve member of the spool and an inner periphery of the sleeve. The radial gap is 0.0005 inches to 0.005 inches. The spool is rotatably supported by a bearing adjacent to each end of the spool. The bearings are axially outside of a plurality of seals of the valve assemblies such that the bearings are not exposed to a fluid flowing through the housing.

In yet another aspect, the invention provides a method for making a trip block which advantageously reduces the cost of manufacture of the trip block. An embodiment of such a method includes the steps of providing a housing, and situating a portion of each of a plurality of valve assemblies within said housing. Each valve assembly includes a rotary valve member arrangement.

In this embodiment, the step of providing the housing includes providing the housing with a first, a second, and a third cavity extending parallel to one another. The step of providing also includes providing the housing with a first flow passage extending only between the first cavity and the second cavity. The step of providing also includes providing the housing with a second flow passage extending only between the first cavity and the second cavity. The step of providing also includes providing the housing with a third flow passage extending only between the second cavity and the third cavity. The step of providing also includes providing the housing with a fourth flow passage extending between the first cavity, the second cavity, and the third cavity.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of the invention herein provide a compact, lightweight trip block with relatively low actuation requirements. As will be explained in greater detail below, these advantages are achieved by utilizing a common housing for multiple valve assemblies. This is a significant departure from prior designs which typically include separate stand-alone valves each having their own housing and valve assembly and which are interconnected to one another using exterior plumbing or a manifold. The above advantages are also achieved by utilizing valve assemblies which employ contamination resistant rotary valve member arrangements. This is also a significant departure from prior designs which typically employ linear valve members that are highly sensitive to contamination due to their tight radial clearances and centering requirements.

Figure 1:
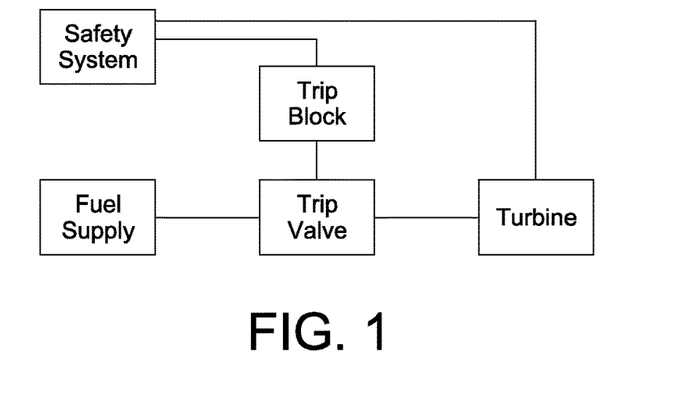
FIG. 1 is a schematic view of a turbine safety system employing a trip block according to the teachings of the present invention.

Turning now to FIG. 1, a general schematic view is shown illustrating one embodiment of an arrangement employing a trip block according to the teachings herein. As shown, a turbine is connected to a trip valve which controls a fuel supply to the turbine. A safety system monitors the turbine. The trip block is connected to the safety system and to the trip valve. In the event the safety system detects an unsafe operating condition, it removes power applied to the trip block. The trip block employs a number of valve assemblies which are held closed when power is applied to the trip block. In the event of the aforementioned unsafe condition, the removal of power applied to the trip block causes the valve assemblies to return to their default open position. This opening of the trip block allows hydraulic fluid which generates a pressure to hold trip valve open to flow through the trip block and thus remove the pressure from the trip valve, causing it to close. This ultimately removes the fuel supply to the turbine.

Figure 2:
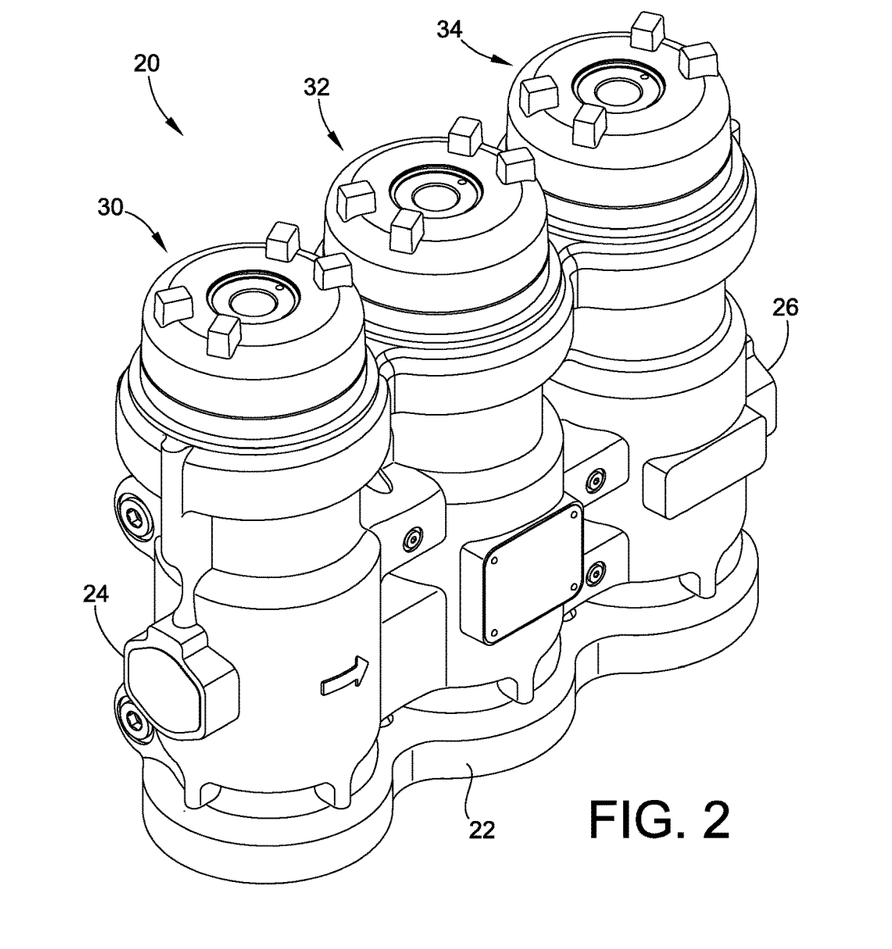
FIG. 2 is a perspective view of one embodiment of a trip block according to the teachings of the present invention.

Turning now to FIG. 2, a perspective illustration of an embodiment of a trip block 20 according to the invention is illustrated. This embodiment includes a housing 22 commonly housing a plurality of valve assemblies 30, 32, 34. The housing includes an inlet 24 and an outlet 26. As will be explained in greater detail below, valve assemblies 30, 32, 34 are arranged and configured to selectively allow fluid to flow from inlet 24 to outlet 26. This embodiment is a redundant system in that in the event any one of valve assemblies 30, 32, 34 fails to return to its default position, the other two remaining valve assemblies are all that is necessary to open the flow path from inlet 24 to outlet to close a trip valve as described above. Additionally it will be recognized from inspection of FIG. 2 that the valve assemblies 30, 32, 34 share housing 22 which results in a much smaller and more space efficient design than prior designs which separately house their valve assemblies independently of one another.

Figure 3:
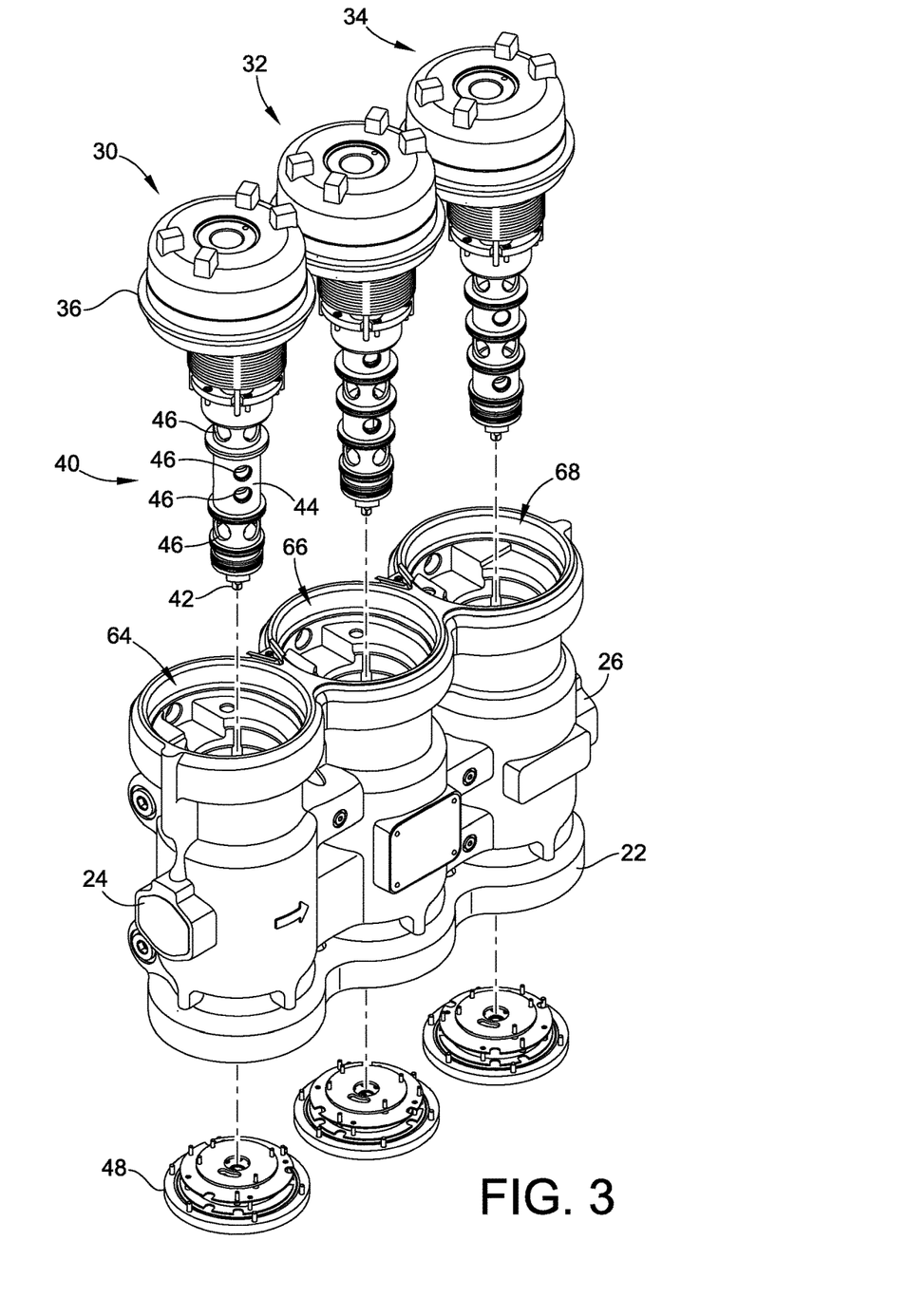
FIG. 3 is an exploded perspective view of the trip block of FIG. 2.

Turning now to FIG. 3, each valve assembly 30, 32, 34 includes a rotary actuator 36 for actuating a valve member arrangement 40 of the valve assembly. Rotary actuator 36 is illustrated as an electric rotary actuator, but in other embodiments could be embodied as a hydraulic, fueldraulic, or pneumatic rotary actuator. Valve member arrangement 40 includes a spool 42 rotatably disposed within a sleeve 44 of valve member arrangement 40. Sleeve 40 includes a plurality of ports 46. Spool 44 also includes a plurality of ports 56 (See FIG. 4) which are selectively alignable with ports 46 to govern fluid flow through valve member arrangement 40. When ports 46, 56 are aligned, fluid may flow into an interior of valve member arrangement 40 and then out of valve member arrangement 40 through axially adjacent ports 46. The number and arrangement of ports 46, 56 will vary across valve assemblies 30, 32, 34 to achieve the various flow paths described relative to FIGS. 7-11. Other than this number and arrangement of ports, each of valve assemblies 30, 32, 34 are of the same construction. As a result, the description of one of valve assemblies 30, 32, 34 generally applies to the remainder of valve assemblies 30, 32, 34.

Still referring to FIG. 3, as discussed in greater detail herein, each valve member arrangement 40 advantageously employs a contamination resistant configuration. This is achieved by cordoning off contamination sensitive components such as the bearings 54 (See FIG. 4) of valve member arrangement 40 from the fluid flow through trip block 20. Further, a radial clearance gap is formed between spool 42 and sleeve 44 which is larger than the typical contaminant particle size such that the risk of contaminants binding spool 42 within sleeve 44 is reduced or entirely eliminated. Such a configuration is also discussed at U.S. patent application Ser. No. 13/597,450 assigned to the instant assignee and incorporated by reference herein in its entirety. One example of such a radial clearance gap is between about 0.0005" and about 0.005". However, those skilled in the art will recognize that the other radial clearances are conceivable depending upon application, particularly expected contaminant particle size.

Each valve assembly 30, 32, 34 is respectively received within a corresponding cavity 64, 66, 68 of housing 22. Each valve assembly 30, 32, 34 also includes a return device 48 positioned at the bottom of said cavities 64, 66, 68. Return device 48 is mechanically coupled to an end of spool 42 and is operable to bias spool 42 to its default position in the event of a power loss to actuator 36. Return device 48 is embodied in FIG. 3 as a typical coil spring arrangement which applies a torque about spool 42. When power is applied to actuator 36, this torque is overcome. More specifically, actuator 36 is coupled to the other end of spool 42 and can rotate the same into a desired orientation within sleeve 44 to selectively align ports 56 with ports 46.

Figure 4:
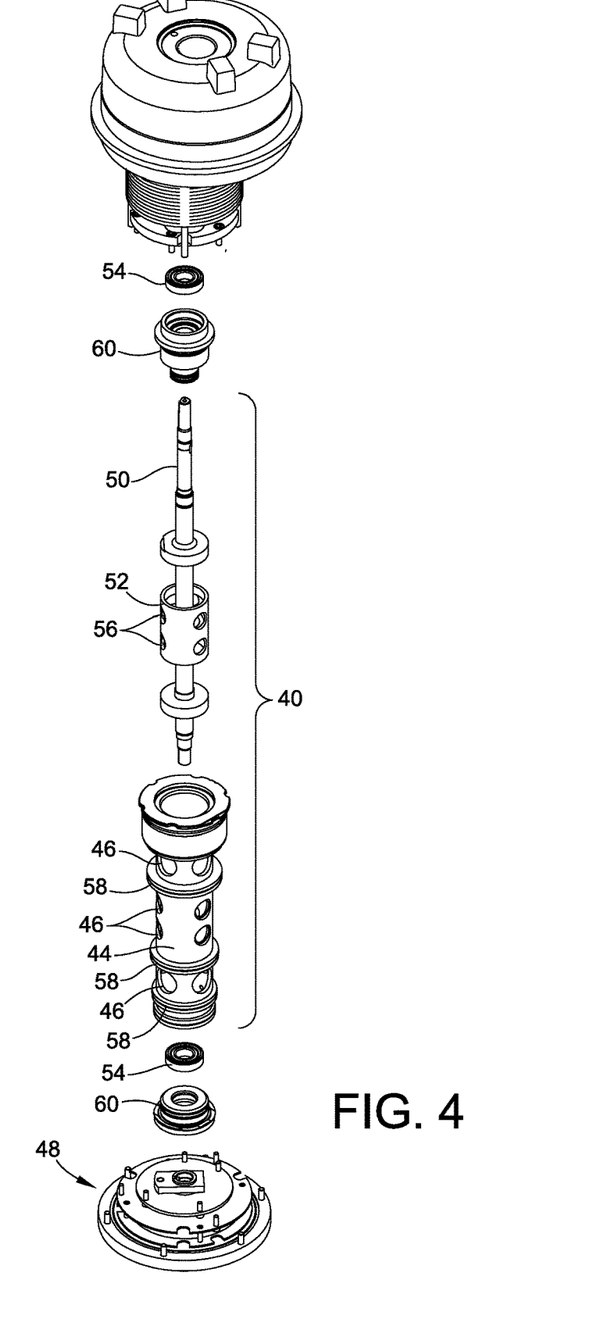
FIG. 4 is an exploded perspective view of a valve assembly of the trip block of FIG. 2.
Figure 6:
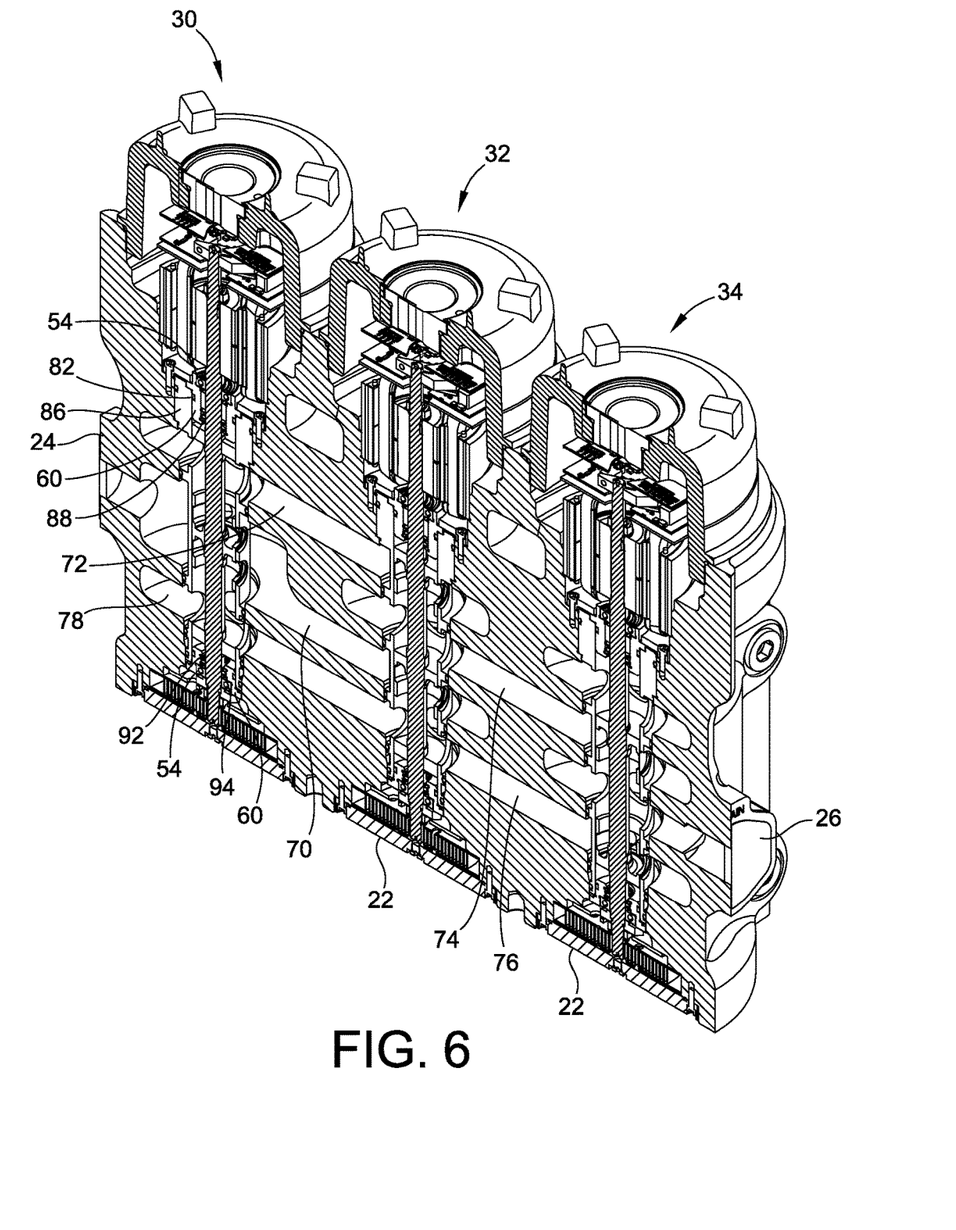
FIG. 6 is a perspective cross section of the trip block of FIG. 2.

Turning now to FIG. 4, one of valve assemblies 30, 32, 34, particularly valve assembly 30, is shown in an exploded view. As can be seen therein, spool 42 (see FIG. 3) includes a shaft 50 upon which at least one valve member 52 is mounted. In FIG. 4, a single valve member 52 is utilized, however, more than one valve member 52 is utilized on valve assemblies 32, 34 as can be seen in FIG. 6. Valve member 52 includes a plurality of ports 56 formed through a sidewall thereof. These ports 56 are selectively alignable with ports 46 which are formed through a sidewall of sleeve 42. As can also be seen in FIG. 4, this valve member 52 is a combination of two axially opposed valve members each with their own array of ports 46.

A number of seals 58 are also positioned on an exterior of sleeve 42 to prevent fluid from unintentionally flowing axially along an exterior of sleeve 42 from one port 46 to another port 46 axially spaced therefrom and separate by a seal 58 without first passing through ports 56 of valve member 52. When ports 46, 56 are aligned, fluid flows into an interior of valve member arrangement 40 and out of other ones of ports 46 as discussed below. Spool 42 is rotatably mounted by bearings 54 within sleeve 44. Bearings 54 are contained within bearing caps 60. A number of seals are employed relative to bearing caps 60 and shaft 50 to isolate bearings 54 from fluid flow as described below relative to FIG. 6.

Figure 5:
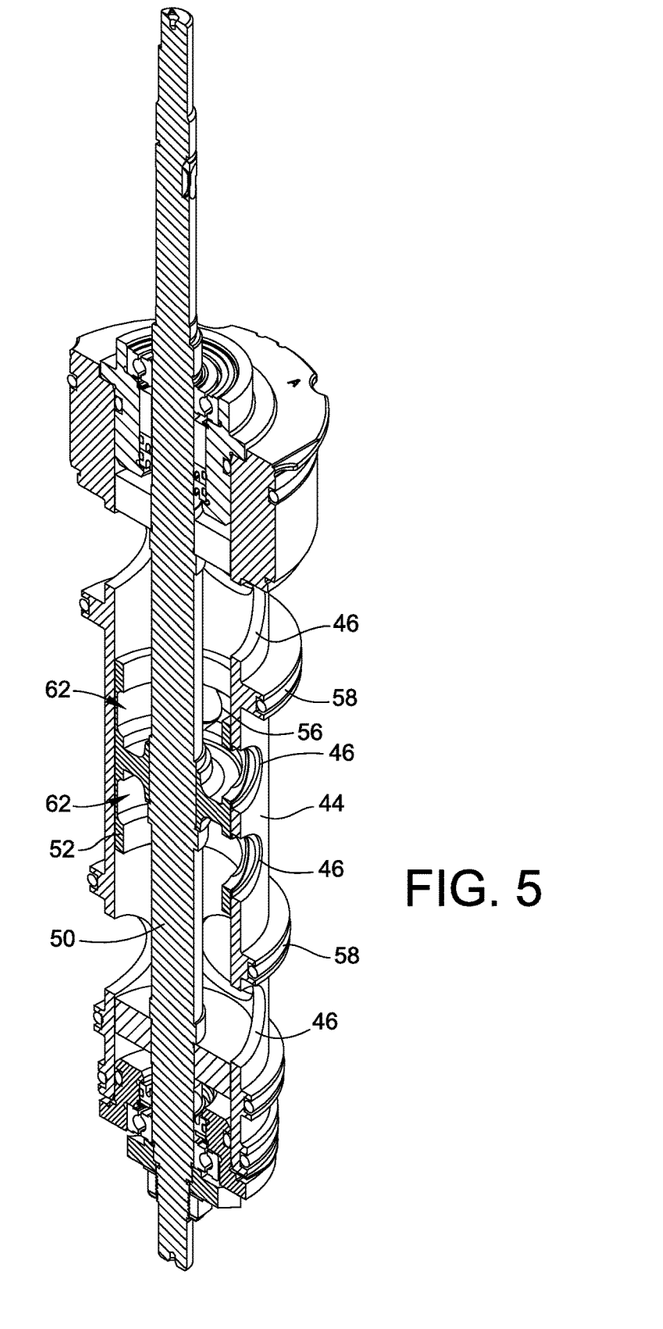
FIG. 5 is a partial cross section of the valve assembly of FIG. 4.

Turning now to FIG. 5, a cross section taken through valve member arrangement 40 is illustrated. As shown therein, a trepanned groove 62 is machined on an inner surface of valve member 52. This groove 62 extends continuously around the interior surface of valve member 52 in the area of ports 56. With particular reference to valve member 52 of valve assembly 30 illustrated in FIG. 5, there are two arrays of ports 56, with the arrays axially spaced from one another. The aforementioned groove 62 is machined into the interior surface of valve member 52 for each array. As a result, the area surrounding each port 56 has a reduced wall thickness such that each port 56 has a relatively thin control edge. This results in a reduction of flow forces upon valve member 52 as it is rotated from open to closed and vice versa.

Turning now to FIG. 6, trip block 20 is illustrated in cross section. As can be understood from inspection of FIG. 6, housing 22 includes a number of internal passages fluidly communicating cavities 64, 66, 68. Indeed, a first passage 70 extends only between cavity 64 and cavity 66. A second passage 72 extends only between cavity 64 and cavity 66. A third passage 74 extends only between second cavity 66 and third cavity 68. A fourth passage 76 extends between first, second and third cavities 64, 66, 68. Such a configuration advantageously presents a more efficient design in that the aforementioned passages 70, 72, 74 only extend between certain ones of the cavities 64, 66, 68 as opposed to each passage 70, 72, 74 extending between each cavity 64, 66, 68. This reduces the complexity of the housing.

As can also be seen in FIG. 6, each passage 70, 72, 74, 76 includes an enlarged portion 78 at the ends thereof which surrounds the respective cavities 64, 66, 68 that the passage connects. This enlarged portion 78 is enlarged such that it has a cross sectional area normal to a direction of flow between the inlet 24 and the outlet 26 which is larger than a cross sectional area normal to the direction of flow of each respective flow passage adjacent the enlarged portion thereof. In the case of valve assembly 30, such a configuration allows for fluid to flow around valve member arrangement 40 thereof and continue within first passage 70 when fluid is prevented from flowing into valve member arrangement 40 due to the position of spool 42 within sleeve 44.

As introduced above, bearings 54 are cordoned off from fluid flow by a plurality of seals which will now be described in greater detail. Referring specifically to valve assembly 30, a seal 82 is radially positioned between upper bearing cap 60 and an interior surface of a portion 84 of sleeve 44. Another seal 86 is positioned between an interior surface of a portion 84 of sleeve 44 and housing 22. As a result, fluid is prevented from flowing entirely between the interface of bearing cap 60 and 44, as well as the interface between sleeve 44 and housing 22. Further, isolation seals 88 surround shaft 50 of spool 42 such that fluid is prevented from flowing axially along shaft 50 and into the region containing the upper bearing 54.

A similar sealing arrangement is also provided at the other end of valve assembly 30. A seal 92 is provided between bearing cap 60 and an interior surface of sleeve 44. One of the above discussed seals 58 on sleeve 44 is positioned between sleeve 44 and housing 22. Further, isolation seals are also provided along shaft 50. As a result, fluid is also prevented from flowing into the region containing the lower bearing 54. Because the bearings 54 are not subjected to contaminated fluid, a reduced actuation force is required.

Figure 7:
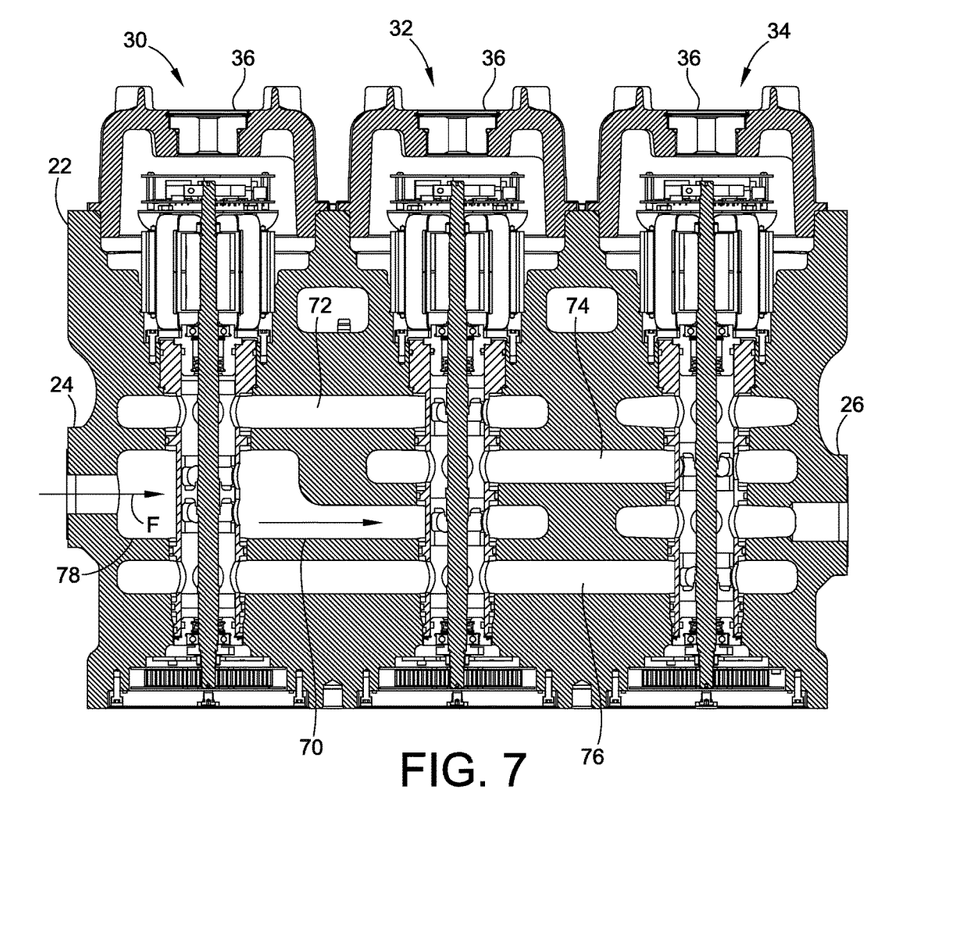
FIGS. 7-11 are cross sections of the trip block of FIG. 2, illustrating various operational states thereof.

Turning now to FIGS. 7-11, a discussion will now be provided for the operation of trip block 20. With particular reference to FIG. 7, illustrates an instance where each of valve assemblies 30, 32, 34 are in their normal operational condition, that is, power is applied to each actuator 36 thereof. In such a configuration, fluid flows into inlet 24 as shown by directional arrow F. This fluid flow continues around valve member arrangement 40 of valve assembly 30 via enlarged portion 78 of first passage 70 because the ports 46, 56 of valve member arrangement 40 of valve assembly 30 are not aligned, i.e. it is closed. This fluid continues to flow through first passage 70 until it reaches valve assembly 32. Valve member arrangement 40 of valve assembly 32 is also closed. As a result, fluid is prevented from reaching outlet 26.

Figure 8:
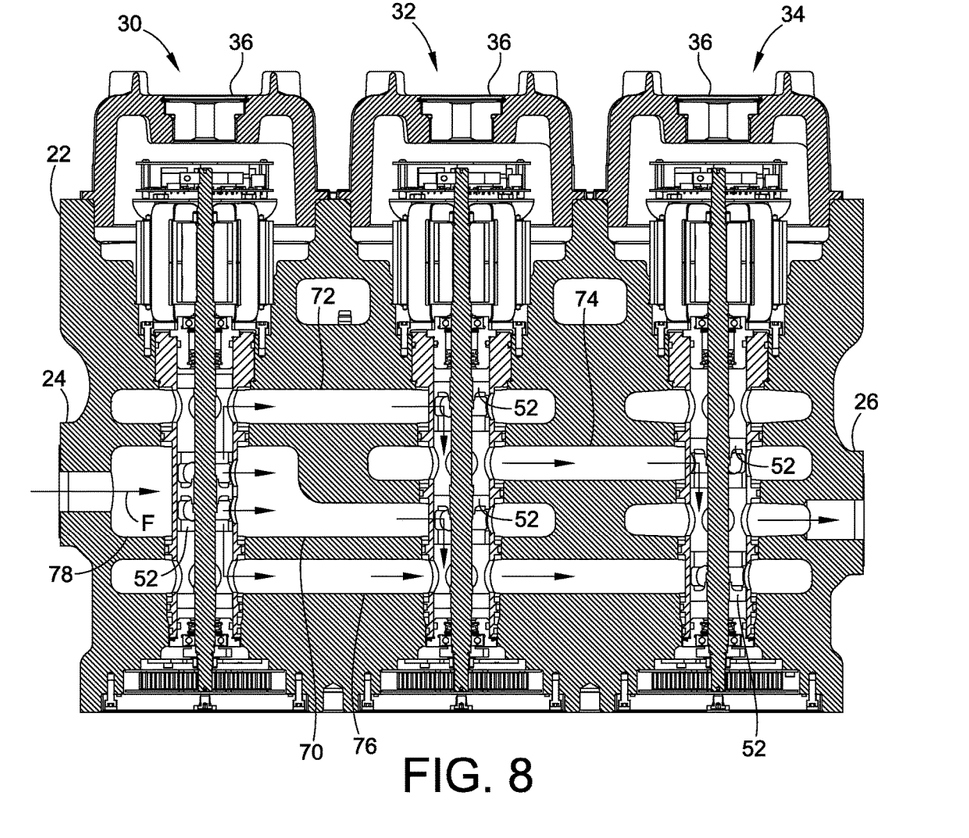

Turning now to FIG. 8, the same illustrates an instance where valve assemblies 30, 32 have been moved to their default position by their respective return device 48. However, valve assembly 34 has failed to move to its default position. As a result, fluid flows into inlet 24 as shown by directional arrow F. This fluid continues to flow through valve member arrangement 40 of valve assembly 30 due to the alignment of the ports 46, 56 thereof, i.e due to it being in an open position. Fluid then flows through first passage 70, second passage 72 and fourth passage 76 until it encounters valve assembly 32. Valve member arrangement 40 of valve assembly 32 is also in an open position. As a result, fluid flows into an interior of valve member arrangement 40 from first passage 70 and second passage 72. Fluid also readily flows into the interior of valve member arrangement 40 of valve assembly 32 from fourth passage 76 as there is no valve member 52 in this region within valve member arrangement 40 of valve assembly 32 to prevent such flow. Further, an enlarged portion 78 exists around valve assembly 32 in fourth passage 76 which permits fluid to flow around an exterior of sleeve 44 of valve member arrangement 40 of valve assembly 32.

Fluid may thus continue along third passage 74 and fourth passage 76 until it encounters valve assembly 34. Valve assembly 34 includes opposing valve members 52 such that when one is open, the other is closed. More specifically, the ports 56 of the upper-most valve member 52 are aligned with the ports 46 of sleeve 44. However, the ports 56 of the lower-most valve member 52 are not aligned with ports 46 of sleeve 44. As a result, fluid flows from third passage 74 into valve member arrangement 40 of valve assembly 34 then then to outlet 26. As such, and despite a failure of valve member 34 to move to its default position, fluid may still pass from inlet 24 to outlet 26.

Figure 9:
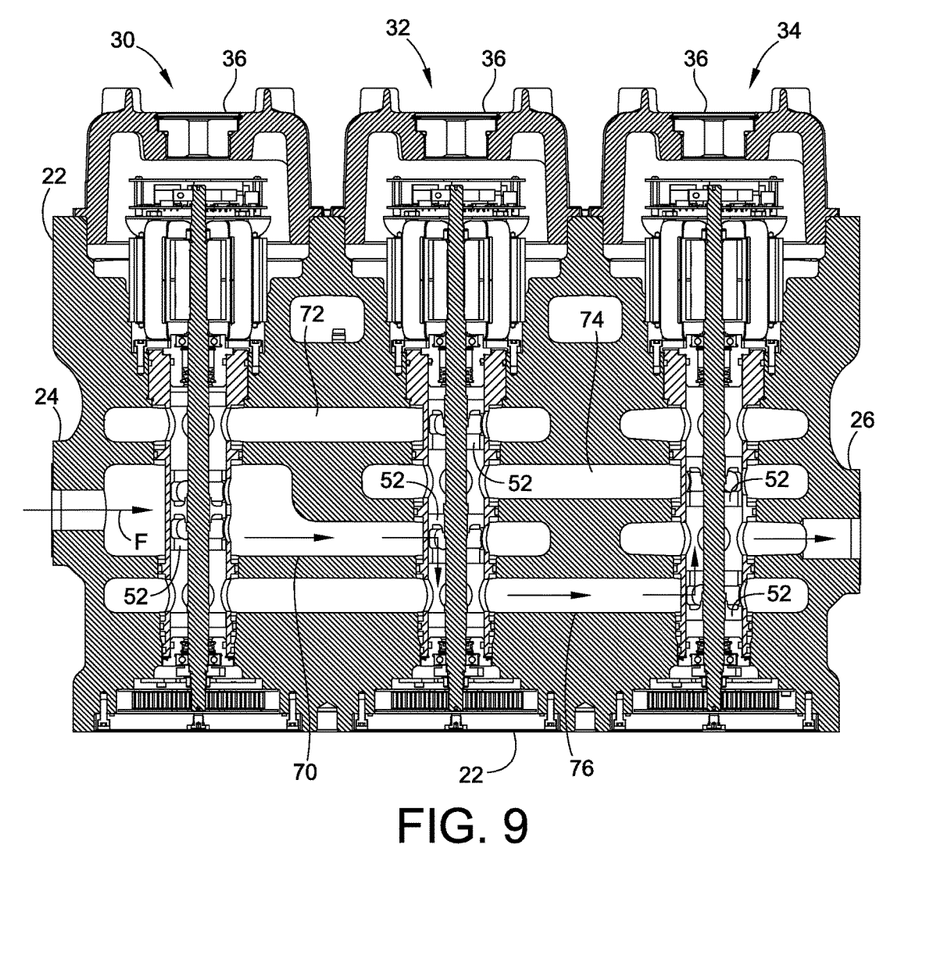

Turning now to FIG. 9, the same illustrates an instance where valve assemblies 32, 34 have been moved to their default position by their respective return device. However, valve assembly 30 has failed to move to its default position. As a result, fluid flows into inlet 24 as shown by directional arrow F. This fluid flows around valve member arrangement 40 of valve assembly 30 given that it is closed. Fluid then flows through first passage 70 until it encounters valve assembly 32. Valve member arrangement 40 of valve assembly 32 is in an open position. As a result, fluid flows into an interior of valve member arrangement 40 from first passage 70. Due to the close sizing of valve member 52 with sleeve 44, and given that valve member 52 has an axially closed upper end, substantial fluid flow upward through valve arrangement 40 of valve assembly 32 is prevented.

However, valve member 52 has an axially open bottom, such that fluid may flow downwardly through valve member arrangement 40 of valve assembly 32 and continue along fourth passage 76 as shown. When valve assembly 34 has moved to its default position, ports 46 of lower valve member 52 and sleeve 44 of valve member arrangement 40 of valve assembly 34 are aligned. As a result, fluid may readily flow into valve member arrangement 40 of valve assembly 34 and then out through outlet 26. As such, and despite a failure of valve assembly 30 to move to its default position, fluid may still pass from inlet 24 to outlet 26.

Figure 10:
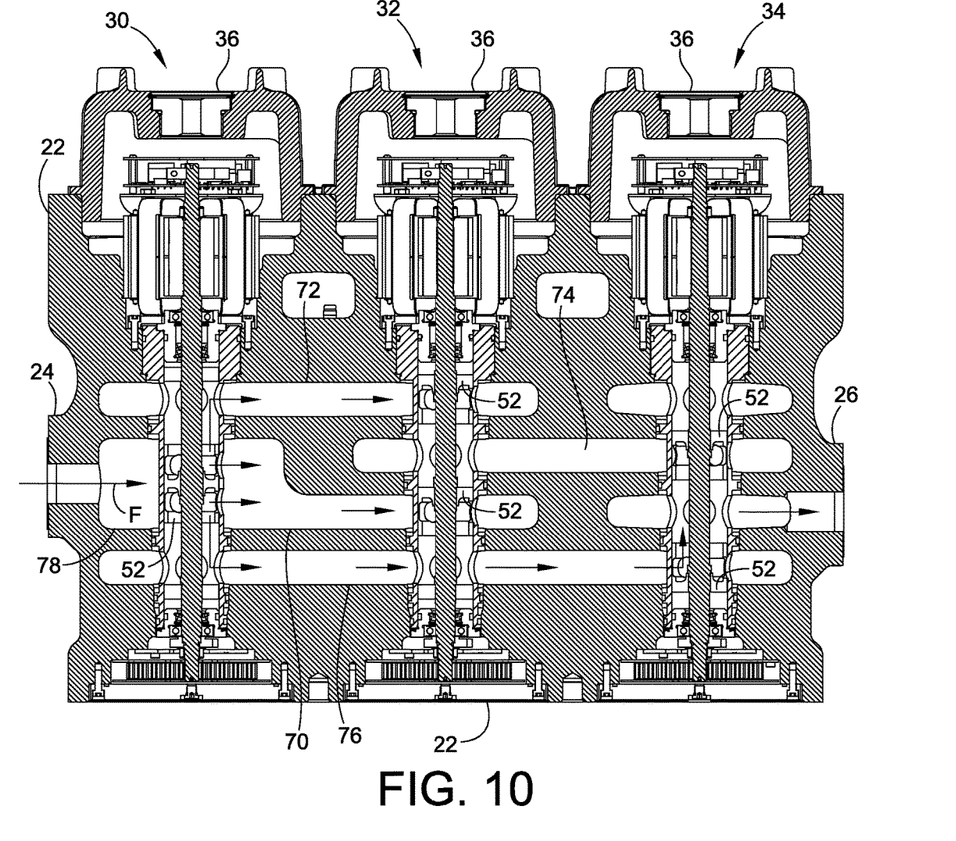

Turning now to FIG. 10, the same illustrates an instance where valve assemblies 30, 34 have been moved to their default position by their respective return device. However, valve assembly 32 has failed to move to its default position. As a result, fluid flows into inlet 24 as shown by directional arrow F. This fluid continues to flow through valve member arrangement 40 of valve assembly 30 due to the alignment of the ports 46, 56 thereof, i.e due to it being in an open position. Fluid then flows through first passage 70, second passage 72 and fourth passage 76 until it encounters valve assembly 32. Valve member arrangement 40 of valve assembly 32 is also in closed position. As a result, fluid may only flow around valve assembly 32 in the enlarged portion 78 in fourth passage 76. When valve assembly 34 has moved to its default position, ports 46 of lower valve member 52 and sleeve 44 of valve member arrangement 40 of valve assembly 34 are aligned. As a result, fluid may readily flow into valve member arrangement 40 of valve assembly 34 and then out through outlet 26. As such, and despite a failure of valve assembly 32 to move to its default position, fluid may still pass from inlet 24 to outlet 26.

Figure 11:
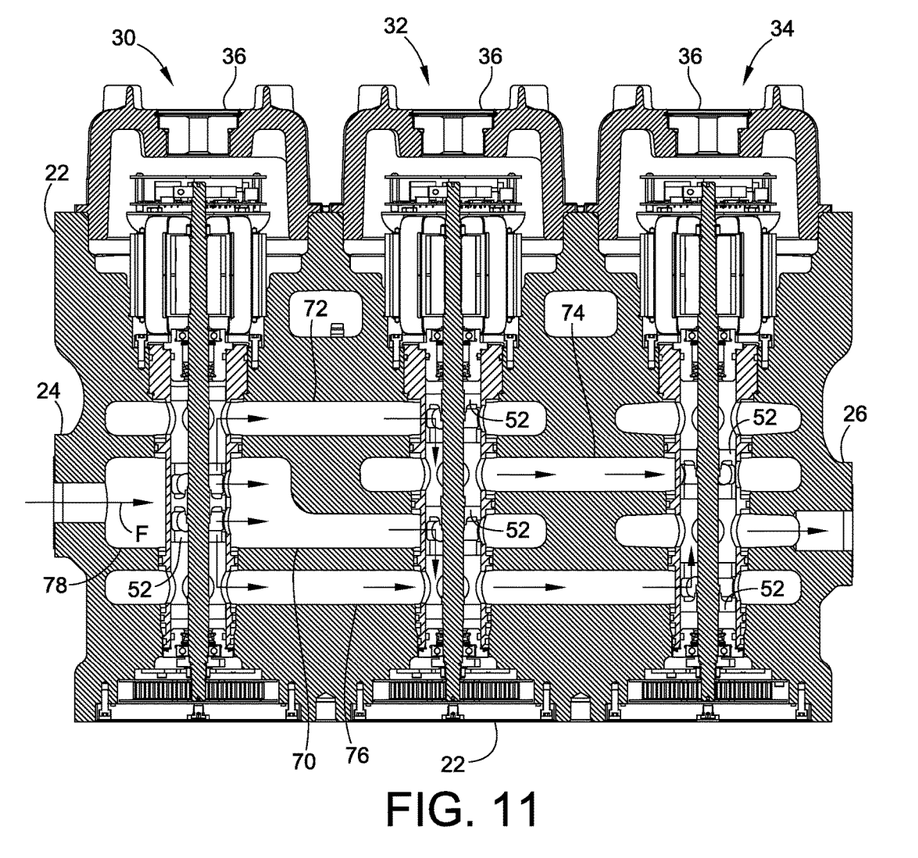

Lastly, FIG. 11 illustrates an instance where each of valve assemblies 30, 32, 34 have moved to their default position. Fluid flows into inlet 24 as shown by directional arrow F. This fluid continues to flow through valve member arrangement 40 of valve assembly 30 due to the alignment of the ports 46, 56 thereof, i.e due to it being in an open position. Fluid then flows through first passage 70, second passage 72 and fourth passage 76 until it encounters valve assembly 32. Valve member arrangement 40 of valve assembly 32 is also in an open position. As a result, fluid flows into an interior of valve member arrangement 40 from first passage 70 and second passage 72. Fluid also readily flows into the interior of valve member arrangement 40 of valve assembly 32 from fourth passage 76 as there are no valve members 52 in these regions within valve member arrangement 40 of valve assembly 32 to prevent such flow.

Fluid may thus continue along third passage 74 and fourth passage 76 until it encounters valve assembly 34. The upper-most valve member 52 of valve member arrangement 40 of valve assembly 34 prevents fluid from flowing into an interior thereof from third passage 74. However, fluid is permitted to flow into valve member arrangement 40 through lower most valve member 52 of valve member arrangement 40 of valve assembly 34. This fluid then continues to flow through outlet 26.

As described above, embodiments of the invention advantageously provide a compact, low-part count trip block that overcomes existing problems in the art by utilizing a common housing for multiple rotary valve assemblies and by requiring a relatively reduced actuation force for each valve assembly.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trip block, comprising:
   a housing having an inlet, an outlet, and a plurality of interconnected passageways;
   a plurality of valve assemblies, wherein a portion of each valve assembly is housed within the housing, wherein each valve assembly of the plurality of valve assemblies includes a rotary valve member arrangement and an actuator for actuating the rotary valve member arrangement;
   wherein each one of the plurality of valve assemblies is arranged within the housing to govern a flow of fluid between the inlet and the outlet;
   wherein the rotary valve member arrangement of each one of the plurality of valve assemblies includes a spool rotatably disposed within a sleeve;
   wherein the spool includes a shaft and at least one valve member mounted to the shaft
   wherein the at least one valve member is cup-shaped and includes a plurality of ports extending through a sidewall of the at least one valve member;
   wherein an interior surface of the sidewall of the at least one valve member includes a continuous groove which extends across each one of the plurality of ports such that the side wall has a reduced cross sectional thickness in an area of each port.

2. A trip block, comprising:
   a housing having an inlet and an outlet;
   a first valve assembly partially disposed within a first cavity of the housing, the first cavity extending normal to a direction of flow between the inlet and outlet;
   a second valve assembly partially disposed within a second cavity of the housing, the second cavity normal to the direction of flow between the inlet and the outlet;
   a third valve assembly partially disposed within a third cavity of the housing, the third cavity normal to the direction of flow between the inlet and the outlet;
   a first flow passage extending only between the first cavity and the second cavity;
   a second flow passage extending only between the first cavity and the second cavity;
   a third flow passage extending only between the second cavity and the third cavity; and
   a fourth flow passage extending between the first cavity, the second cavity, and the third cavity.

3. The trip valve of claim 2, wherein each of the first, second, and third flow passages includes an enlarged portion at endpoints of the respective first, second, and third flow passage.

4. The trip valve of claim 3, wherein the enlarged portion has a cross sectional area normal to a direction of flow between the inlet and the outlet which is larger than a cross sectional area normal to the direction of flow of each respective flow passage adjacent the enlarged portion thereof.

5. The trip valve of claim 3, wherein the first, second, and third valve assemblies each includes a rotary valve member arrangement, an actuator for actuating the rotary valve member arrangement, and a return device coupled to the valve member arrangement.

6. The trip valve of claim 5, wherein the rotary valve member arrangement includes a spool rotatably mounted within a sleeve of the rotary valve member arrangement.

7. The trip valve of claim 6, wherein the sleeve includes a plurality of seals along an outer periphery thereof for sealingly engaging an interior surface of the housing.

8. The trip block of claim 6, wherein a radial gap is formed between an outer periphery of at least one valve member of the spool and an inner periphery of the sleeve.

9. The trip block of claim 8, wherein the radial gap is 0.0005 inches to 0.005 inches.

10. The trip block of claim 6, wherein the spool is rotatably supported by a bearing adjacent each end of the spool, wherein the bearings are axially outside of a plurality of seals of the valve assembly such that the bearings are not exposed to a fluid flowing through the housing.

11. A method for making a trip block, the method comprising the steps of:
   providing a housing;
   situating a portion of each of a plurality of valve assemblies within said housing, wherein each valve assembly includes a rotary valve member arrangement;
   wherein the step of providing the housing includes providing the housing with a first, a second, and a third cavity extending parallel to one another, and providing the housing with a first flow passage extending only between the first cavity and the second cavity, a second flow passage extending only between the first cavity and the second cavity, a third flow passage extending only between the second cavity and the third cavity, and a fourth flow passage extending between the first cavity, the second cavity, and the third cavity.

\* \* \* \* \*